April 23, 1940.  H. A. SMITH  2,198,133
THERMOSTAT
Filed April 3, 1939
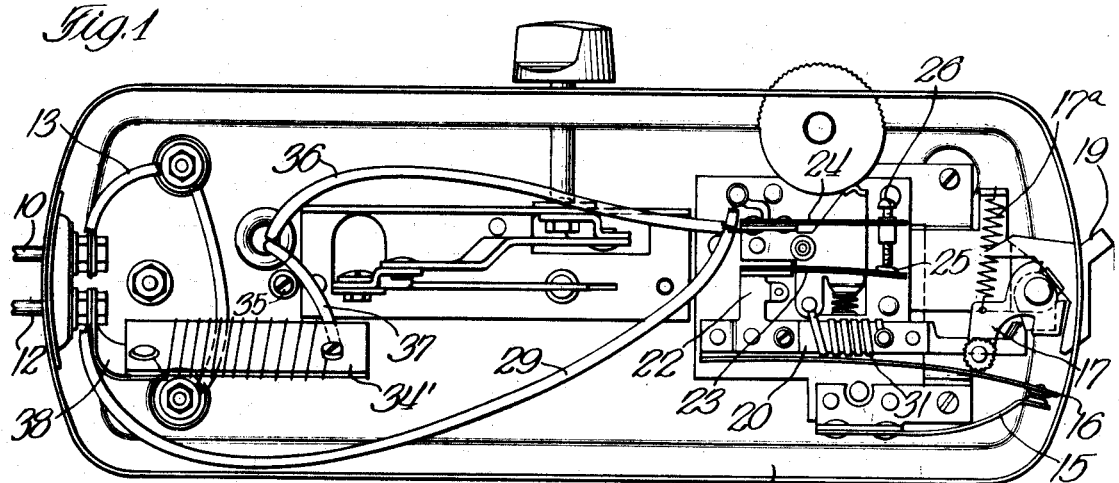
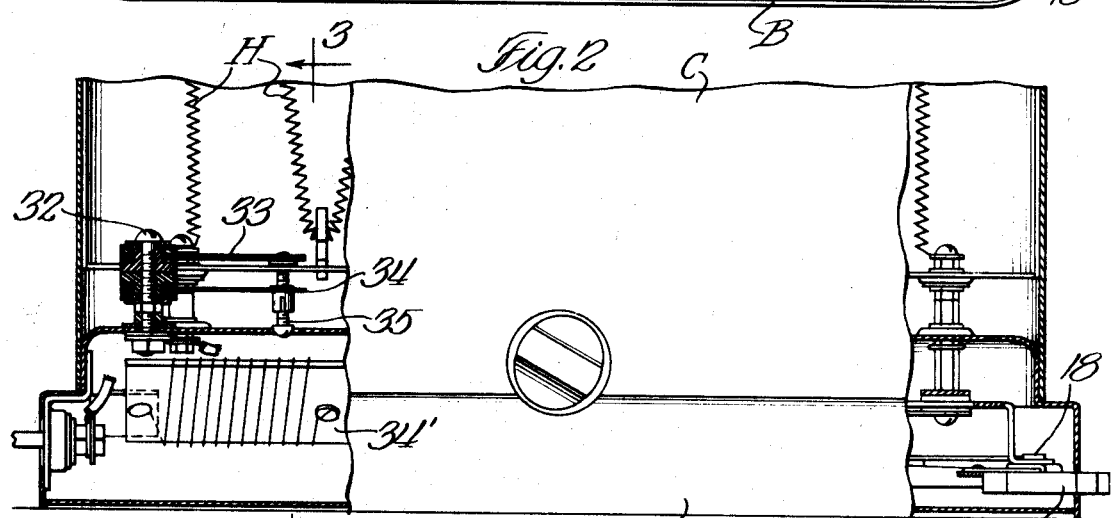
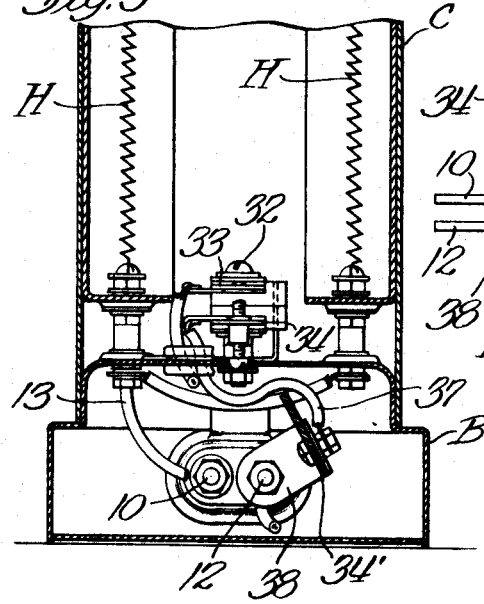
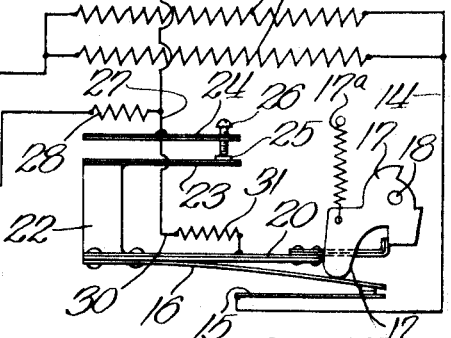
INVENTOR.
Howard A. Smith
BY Bair & Freeman
ATTORNEYS Patented Apr. 23, 1940

2,198,133

UNITED STATES PATENT OFFICE 2,198,133

THERMOSTAT

Howard A. Smith, St. Louis, Mo., assignor to Knapp-Monarch Company, St. Louis, Mo., a corporation of Missouri Application April 3, 1939, Serial No. 265,647

6 Claims. (Cl. 219—19)

An object of my invention is to provide a thermostat particularly designed for compensating purposes in connection with a timing thermostat of a bread toaster or the like.

Another object is to provide a compensating thermostat for adapting a temperature responsive timer for electric appliances such as shown in the copending application of Joseph E. Brosseau, Serial No. 75,596, filed April 21, 1936, for operation in an oven type toaster whereby the initial heating period, which is too long with the timer, can be cut down to any desired degree after which the timer can cycle in response to bread toasting operations and temperature of the toaster in the usual manner intended.

More particularly, it is my object to provide in connection with a thermostatic timer having a heater operating the timer, a means to shorten the initial timing period consisting of a normally open compensating termostat and a resistance element so connected in circuit with the heater that during the first part of the initial heating period of the toaster the heater will be energized at a greater rate than during the latter part thereof.

Various other objects of the invention and features of improvement characterizing the same will be brought out in the course of the detailed specification, after which those features deemed to be patentable as well as novel will be particularly set forth in the appended claims.

With the foregoing objects in view, the invention will now be described in detail in connection with the accompanying drawing illustrating one form of the apparatus for embodying the features of improvements.

In the drawing:

Figure 1 is a bottom plan view of a toaster including my thermostat;

Figure 2 is a side elevation thereof with portions of the toaster broken away and other portions thereof shown in section;

Figure 3 is a sectional view on the line 3—3 of Figure 2, and

Figure 4 is an electrodiagrammatic view of the invention.

On the accompanying drawing I have used the reference character B to indicate a base of a bread toaster and C a casing thereof. Within the casing C a pair of heating elements H are provided, one for each side of the slice of toast in the toaster.

Current supply terminals 10 and 12 are provided for the heating elements H. The terminal 10 is connected by a wire 13 to one end of each element while the other ends thereof are connected by a wire 14 to a switch blade 15. A switch blade 16 is adapted to cooperate with the blade 15. The switch blades 15 and 16 are normally separated and may be manually engaged with each other by swinging a plate 17 pivoted at 18 to the position shown in Figures 1 and 4 by manually manipulating a control handle 19 therefor.

A bimetal latch 20 is provided for the plate 17 and it is connected by a bracket 22 to a bimetal blade 23. Another bimetal blade 24 has circuit controlling connection with the blade 23 through the medium of a contact 25 and a screw 26. The blade 24 is electrically connected with a wire 27, and to this wire an electric heater 28 is connected. The heater 28 is connected by a wire 29 with the terminal 12. The blade 24 is also connected by a wire 30 and resistance element 31 with the bimetal latch 20.

The foregoing described parts 14 to 31, inclusive, form part of the Brosseau switch hereinbefore referred to, and form no part of my present invention which is an addition to the Brosseau switch.

Briefly, the operation of the Brosseau switch is as follows: After a slice of toast is placed in the toasting chamber of the casing C, the switch 15—16 is closed and during the switch closing operation the plate 17 is latched in the position shown in Figure 4. The heating element circuit may now be traced as follows: From terminal 10 through 13, H, 14, 15, 16, 22, 23, 25, 26, 24, 27, 28 and 29 to the terminal 12. The electric current flowing through the heater 28 warps the bimetal bar 24 to a position for separating the screw 26 from the contact 25. This requires a certain time period, which period varies dependent upon ambient temperature affecting the bimetal blade 23. As the toaster warms up, the blade 23 moves to a position for shortening the time cycles so as to obtain substantially even toasting of the bread. When the circuit is broken across 25—26 then current flows through elements 30 and 31 to the latch 20 and switch blade 16 instead of through the elements 24, 26, 25, 23 and 22. The heat generated by the resistance element 31 quickly warps the latch 20 to unlatched position, thus permitting a spring 17ᵃ to swing the plate 17 to position permitting the contact blade 16 to leave the contact blade 15, thus terminating the toasting period.

I have found especially in connection with oven type toasters that the initial heating period is too long and tends to burn the first slice of toast. To overcome this deficiency I provide a compensating thermostat which will now be described. A post or screw 32 is mounted on the top of the base B (see Figure 2) and supports a bimetal blade 33 and a spring blade 34. The blade 34 carries an adjusting contact screw 35. The bimetal blade 33 is connected by a wire 36 with the wire 27, while the spring blade 34 is connected by a wire 37 to a resistance element R. The resistance element R in turn is connected to the terminal 12 by a strap 38 which serves to support an insulating plate 39 on which the resistance is wound.

The compensating thermostat 33 is normally in open circuit position and is adjusted so that during the initial heating period of the toaster by the heating element H it will close, thus connecting the resistance element R in shunt or parallel with the heater 28. This causes the current from the terminal 12 to divide through the resistance element R and the heater 28, thereby reducing the amount of energization of the heater so that its action on the bimetal element 24 will thereafter be slower.

By way of illustration, the initial heating cycle is usually two minutes in duration when the timer switch is used without my compensating thermostat 33. By arranging the thermostat 33 so that it closes after about forty seconds of this period, the heater 28 will be initially heated at a higher rate during the forty second period so that the initial timing cycle may be reduced, for instance, to a minute and a half. The adjusting screw 35 of course can be regulated so as to shorten the initial period to the desired degree for obtaining the same color of toast for the first slice as for succeeding slices toasted in the toaster and timed by the timer switch 15—16.

I thus provide a simple mechanism for compensating for initially long timing periods of the toaster, and the invention may be applied to other electric appliances instead of a toaster, which has been shown merely by way of illustration. It is a comparatively simple matter to test the toaster and adjust the screw 35 so that the first slice of toast will receive substantially the same amount of heat as subsequent slices.

From the foregoing description of the means for accomplishing this end, it is apparent that I have devised a practical and efficient construction for carrying out the desired objects of the invention as regards a simple and economical unit of the character described, and while the foregoing represents one of the preferred forms of embodiment of the invention I desire to reserve the right to make whatever changes or modifications may fairly fall within the scope of the appended claims.

What I claim as new and desire to secure by Letters Patent of the United States is:

1. The combination with a bread toaster having a thermostatically operated timer including a temperature responsive element and an electric heater therefor, said temperature responsive element being effective to terminate the timing period upon energization of said heater for a predetermined period of time; of means to reduce the timing of the temperature responsive element during the initial toasting period only comprising a normally open compensating thermostat in the toasting chamber of said toaster and responsive to heat radiated from the heating element of the toaster, said compensating thermostat being adapted to move from open position to closed position during said initial toasting period and thereafter remain in the closed position during subsequent toaster operations, a resistance element, said compensating thermostat being connected in series therewith, and said compensating thermostat and said resistance element being connected in shunt with said heater.

2. The combination with a toaster having a thermostatically operated timer including an electric heater for operating the timer to terminate the timing period upon energization of said heater for a predetermined period of time; of means to reduce the timing of the timer during the initial toasting period comprising a normally open compensating thermostat relatively quickly responsive to the heat of the toaster, said compensating thermostat being adapted to close during said initial toasting period and thereafter remain closed during subsequent toasting periods and a shunt circuit including said compensating thermostat connected around said heater, said shunt circuit including sufficient resistance to substantially reduce the flow of current through said heater upon closure of said compensating thermostat.

3. The combination with a toaster or the like having a thermostatically operated timer including a temperature responsive actuating element and an electric heater for effecting operation thereof, said temperature responsive element, upon becoming effective, terminating the timing period of said timer; of means to reduce the timing of said actuating element during the initial toasting period comprising a normally open compensating thermostat responsive to heat of the toaster, said compensating thermostat being adapted to close during said initial toasting period and to thereafter remain closed, a resistance element connected in series therewith, said compensating thermostat and said resistance element being connected in parallel with said heater whereby closure of said compensating thermostat will bypass a portion of the current normally flowing through said heater.

4. The combination with an electrical appliance having a heating element and a thermostatically operated timer therefor including a temperature responsive element and an electric heater therefor; of means to modify the timing of the timer only during the initial heating period of the heating element comprising a compensating thermostat responsive to the heat of said heating element, said compensating thermostat being normally in one position and adapted to move to its other position during such initial period upon response to predetermined heating by said heating element, a resistance element in circuit with said compensating thermostat, said resistance element and compensating thermostat being connected in parallel circuit with said heater whereby closure of the compensating thermostat reduces the heating effect of said heater on said temperature responsive element.

5. The combination with an electrical appliance having a heating element and a timer therefor including an electrically operated device; of means to modify the timing of said timer during the initial heating period of the heating element comprising a compensating thermostat so responsive to the heat of said heating element, that it normally operates from a normal position to its other position upon response to heating by said heating element during such initial heating period, a resistance element in circuit with said compensating thermostat, said resistance element and compensating thermostat being shunt connected with said electrically operated device whereby closure of the compensating thermostat reduces the current thereto for subsequent cycles of operation.

6. The combination with an electrical appliance having a heating element and a thermostatically operated timer therefor including an electrically operated device; of means to modify the timing of the timer during the initial heating period of the heating element comprising a compensating thermostat responsive to the heat of said heating element, said compensating thermostat being normally in one position and adapted to move to and stay in its other position upon response to predetermined heating by said heating element and closely repeated subsequent heating cycles, said compensating thermostat being connected in parallel circuit with said electrically operated device whereby closure of the compensating thermostat reduces the heating effect thereof on said timer during all of said subsequent cycles of said appliance.

HOWARD A. SMITH.